(12) United States Patent
Westendorf et al.

(10) Patent No.: US 7,712,139 B2
(45) Date of Patent: May 4, 2010

(54) DATA TRANSMISSION METHOD

(75) Inventors: Andreas Westendorf, Hildesheim (DE); Hans-Juergen Fischer, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1466 days.

(21) Appl. No.: 09/944,915

(22) Filed: Aug. 31, 2001

(65) Prior Publication Data

US 2002/0042878 A1    Apr. 11, 2002

(30) Foreign Application Priority Data

Sep. 1, 2000    (DE) ................. 100 43 499

(51) Int. Cl.
G06F 7/04 (2006.01)
H04L 9/32 (2006.01)
G06F 21/00 (2006.01)

(52) U.S. Cl. .................. 726/26; 713/176; 705/51

(58) Field of Classification Search ............ 726/1–4, 726/5–7, 26; 709/223–229; 716/176; 713/176; 705/51
See application file for complete search history.

(56) References Cited

U.S. PATENT DOCUMENTS

| | | | | |
|---|---|---|---|---|
| 4,264,960 A * | 4/1981 | Gurr | ........................... | 700/295 |
| 5,334,824 A * | 8/1994 | Martinez | ..................... | 705/41 |
| 5,394,333 A * | 2/1995 | Kao | ........................... | 701/217 |
| 5,420,594 A * | 5/1995 | FitzGerald et al. | ..... | 342/357.14 |
| 5,513,107 A * | 4/1996 | Gormley | ....................... | 701/48 |
| 5,568,552 A | 10/1996 | Davis | | |
| 5,650,996 A * | 7/1997 | Bode et al. | .................. | 370/480 |
| 5,729,619 A * | 3/1998 | Puma | .......................... | 382/115 |
| 5,790,664 A * | 8/1998 | Coley et al. | ................. | 709/203 |
| 5,887,269 A * | 3/1999 | Brunts et al. | ................ | 701/208 |
| 5,936,966 A * | 8/1999 | Ogawa et al. | ............... | 370/469 |
| 5,974,368 A * | 10/1999 | Schepps et al. | ............. | 340/5.61 |
| 6,067,586 A * | 5/2000 | Ziegler et al. | ................. | 710/18 |
| 6,088,639 A * | 7/2000 | Fayyad et al. | ................. | 701/45 |
| 6,140,939 A * | 10/2000 | Flick | ..................... | 340/825.69 |
| 6,289,276 B1* | 9/2001 | Ahrens et al. | ............... | 701/200 |
| 6,327,656 B2* | 12/2001 | Zabetian | ..................... | 713/176 |
| 6,342,844 B1* | 1/2002 | Rozin | .......................... | 340/933 |
| 6,408,232 B1* | 6/2002 | Cannon et al. | ................ | 701/29 |
| 6,487,583 B1* | 11/2002 | Harvey et al. | ............... | 709/204 |

(Continued)

FOREIGN PATENT DOCUMENTS

DE    44 42 357    6/1996

(Continued)

OTHER PUBLICATIONS

Menezes et al, "Handbook of Applied Cryptography," 1997, pp. 22-23.*

(Continued)

*Primary Examiner*—Michael Pyzocha
(74) *Attorney, Agent, or Firm*—Kenyon & Kenyon LLP

(57) ABSTRACT

A data transmission method is described, where first data is transmitted to a first processor, then second data based on the first data is transmitted to a second processor, and a check result is transmitted back to the first processor. This permits an independent check of data transmitted to a first processor by a second processor, so that abuse or prohibited use of first data in the first processor can be prevented.

21 Claims, 4 Drawing Sheets

U.S. PATENT DOCUMENTS

| | | | |
|---|---|---|---|
| 6,513,121 B1 * | 1/2003 | Serkowski | 726/29 |
| 6,640,334 B1 * | 10/2003 | Rasmussen | 717/171 |
| 6,704,872 B1 * | 3/2004 | Okada | 713/194 |
| 6,735,699 B1 * | 5/2004 | Sasaki et al. | 726/28 |
| 6,948,073 B2 * | 9/2005 | England et al. | 726/32 |
| 7,003,674 B1 * | 2/2006 | Hamlin | 713/193 |
| 7,040,435 B1 | 5/2006 | Lesesky et al. | 180/167 |
| 7,051,005 B1 * | 5/2006 | Peinado et al. | 705/57 |
| 7,127,413 B1 * | 10/2006 | Yanagisawa et al. | 705/13 |
| 7,233,948 B1 * | 6/2007 | Shamoon et al. | 707/9 |
| 7,237,112 B1 * | 6/2007 | Ishiguro et al. | 713/169 |
| 7,257,426 B1 * | 8/2007 | Witkowski et al. | 455/569.2 |
| 2003/0154075 A1 * | 8/2003 | Schalk et al. | 704/231 |
| 2006/0129290 A1 * | 6/2006 | Zimmerman et al. | 701/29 |

FOREIGN PATENT DOCUMENTS

| | | |
|---|---|---|
| DE | 196 04 150 | 8/1997 |
| EP | 0 602 920 | 6/1994 |
| EP | 0 813 132 | 12/1994 |
| EP | 0 813 132 | 12/1997 |
| EP | 0 833 475 | 4/1998 |
| EP | 0 873 032 | 10/1998 |
| EP | 0 939 012 | 9/1999 |
| EP | 0 986 209 | 3/2000 |
| GB | 2 273 629 | 6/1994 |

OTHER PUBLICATIONS

Rigney et al., *Remote Authentication Dial In User Service (RADIUS)*, Online, Network Working Group, pp. 1-65.

European Telecommunication Standard, ETS 300 608, Digital Cellular Telecommunications System (Phase 2); Specification Of The Subscriber Identity Module—Mobile Equipment (SIM-ME) Interface (GSM 11.11 version 4.21.1); Dec. 1999.

\* cited by examiner

DATA TRANSMISSION METHOD

FIELD OF THE INVENTION

The present invention relates to a data transmission method.

BACKGROUND INFORMATION

German Patent No. 44 42 357 A1 describes a data transmission method in which data is transmitted between a data processing device and a terminal. Before receiving the data transmission, there is a mutual authentification using codes stored in a security module in the data processing device and in the terminal. Furthermore, a code is also transmitted, indicating whether the data records have been altered during the transmission. The security of the transmission is thus linked to the use of these security modules.

SUMMARY

According to an example embodiment of the present invention, data transmitted to a first processor is also checked by transmission of second data based on the first data to a second processor and the correctness of the first data is checked by checking the second data. The security of a data transmission is guaranteed not only by a security module assigned to the terminal, but also an additional check by an independent second processor. In particular, an unauthorized transmission of first data to the first processor can be determined by the second processor in this way even if, for example, the first data originates from an unauthorized source, e.g., an unauthorized copy of a data medium, or if, for example, first data is transmitted from a third processor by an unauthorized party. Data security is then no longer linked to a security module which could itself be stolen, but instead is guaranteed by the additional second processor.

It may be advantageous if error-free transmission of data is checked in the first processor and/or in the second processor, because this makes it possible to detect not only intervention in the data transmission but also transmission errors, and a transmission can be repeated after such a transmission error has been detected.

It may be advantageous for the first data to be transmitted to the first processor from a data medium drive or a third processor, and the identity of the third processor or the data medium is checked by the second processor, because it is possible in this way to detect unauthorized copies of a data medium or a transfer from a third processor which is not authorized for data transmission.

It may also be advantageous for the data to be transmitted in encoded form, in particular, encoded with a private key of the respective transmitting processor and with a public key of the respective receiving processor which is to be transmitted, because secure identification of the respective transmitting processor is also possible directly in this way, in addition to a secure data transfer. Identification may be made on the basis of an electronic signature, i.e., an unambiguous counterfeit-proof electronic identification of the sender in data form.

In addition, a wireless transmission may also be advantageous, because this eliminates the need for a connection to a stationary communications network, thus permitting mobile use of the method.

It may also be advantageous for the second processor to access a database to check the second data. The database may include, for example, all the third processors authorized for transmission, all the authorized data media and/or all the first processors authorized for storing the respective first data, so that a comprehensive verification is possible.

It may also advantageous to initiate a payment process by the second processor as a function of the second data, thus permitting calculation by the second processor of the first data transmitted. This makes it possible to ensure that a user using a program in the form of first data with the first processor will pay a fee only in the case of actual transmission of this data to the first processor. This makes it possible to ensure that a user need not pay for data until actually using it, and not when just having control over the respective data, e.g., due to possession of a data medium containing this data. It is also possible in this way to authorize payment processes by way of the second processor, i.e., payment processes in the form of credit card payments or purchase orders for goods or services whose data records have been transmitted to the first processor.

It may also be advantageous to allow use of the first data by the second processor, so that the first data can be used in the processor only after this license has been transmitted to the first processor, i.e., release of the data by the second processor, so that this prevents use of unauthorized copies of the first data or false first data in the first processor.

It may also be advantageous to store use of the first data by the first processor in the second processor, so that a user profile can be compiled for the first data on the basis of the data stored by the second processor.

It may also be advantageous to restart a check in the first processor if the check has not been run through completely. This prevents individual steps in the check from being skipped in the event of an intentional or unintentional interruption in the checking process, e.g., due to a power failure.

It may also be advantageous to store a program for checking and/or a check result in a nonvolatile form in the second processor. First, this prevents a possible counterfeiting of the program for checking the first data or falsification of a check result. In addition, a check of the first data need not be performed again with each restart of the first processor in the event the check result is stored in a nonvolatile memory.

It may also be advantageous to delete the first data in the first processor if no user license for the first data is transmitted by the second processor. This prevents unauthorized use of the first data in the first processor. This is advantageous in particular when use of the first data is limited in time, so that in the case of a regular verification of a user license if deletion of the user license is detected after expiration of a preselected period of time, the first data is automatically deleted by the first processor.

It may also advantageous to deliver a warning if the first data is not released, so that a user is informed that he cannot use the first data and that he may optionally need to seek another source for acquiring the first data.

It may also advantageous if the second data includes a check code with respect to the first data or the identity of the first processor.

It may also be advantageous to provide a controller in a motor vehicle, in particular as a first processor, to which data is transmitted from a third processor or from a data medium. In particular in the case of systems in a motor vehicle which are relevant for vehicle safety, this permits a check on the data transmitted, so that the function of safety-relevant systems in the motor vehicle cannot be endangered by defective data or data transmitted in an unauthorized manner.

DETAILED DESCRIPTION

A data transmission method according to an example embodiment of the present invention can be used for a variety of applications, in particular for different types of data to be transmitted. The data may include, for example, program data, i.e., data for controlling a processor or a device or data containing information, e.g., data on telephone numbers, addresses and regional maps or road maps. Furthermore, the first data transmitted may also include, for example, data for a payment process, a purchase process or an accounting process. Accordingly, the first processor may also be designed as a processor which controls a program sequence on the basis of the first data, such as a controller in a motor vehicle or an electric household appliance or an electric apparatus for industrial use. The first processor may also be designed as part of a device, for example, for controlled playback of the first data transmitted. Furthermore, the first processor may be integrated into a device for executing the payment process, purchase process or accounting process.

An example embodiment of a method according to the present invention is explained in greater detail below on the basis of its use for a controller in a motor vehicle, in which case first data in the form of program data and/or information is transmitted to the first processor, i.e., the controller. This method can readily also be used in other vehicles such as aircraft, ships or railcars.

Figure 1:
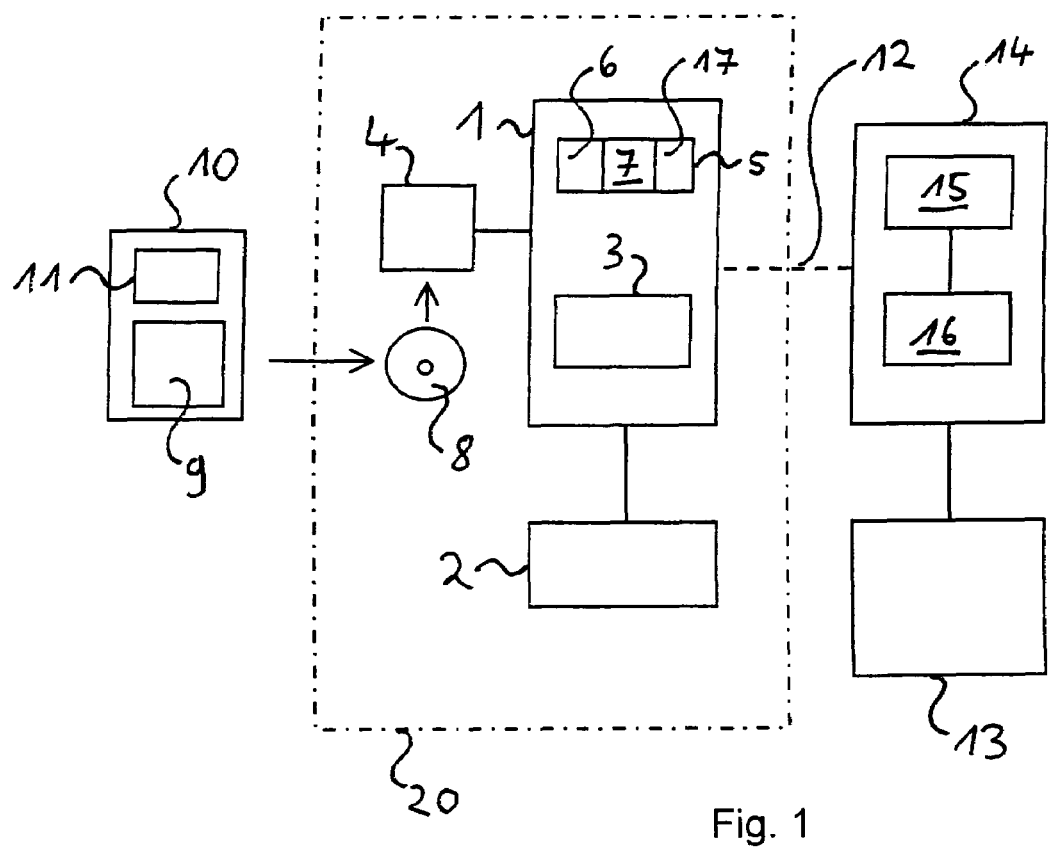
FIG. 1 shows a first exemplary embodiment of a device for carrying out a method according to an example embodiment of the present invention.

FIG. 1 shows a controller 1 in a motor vehicle 20, which is connected to an automotive system 2. Automotive system 2 may be, for example, an engine control unit which controls a combustion process in the automotive engine or the power conversion of the automotive engine, a display device in the motor vehicle for displaying information to be displayed or a navigation device which outputs driving instructions to a user of the vehicle. A first processor 3 is arranged in controller 1. Furthermore, controller 1 has a nonvolatile memory 5 which is divided into at least a first area 6, a second area 7 and a third area 17. Controller 1 is also connected to a first data medium drive 4 for a data medium 8, which is also arranged in motor vehicle 20. In a device for data medium processing 10, data medium 8 is written with data from a third processor 11 in a second data medium drive 9. Controller 1 is also connected to a test unit 14 by a first wireless connection 12. Test unit 14 has a second processor 15 and a database 16 and is connected to an accounting office 13.

Data of third processor 11 is written by the device for data medium processing 10 to data medium 8 via second data medium drive 9. Data medium 8 may be, for example, an optical and/or magnetic data medium. When using an optical data medium, mechanical production of the data medium in second data medium drive 9 is also possible. The device for data medium processing 10 is arranged outside motor vehicle 20.

Data medium 8 is introduced into motor vehicle 20 by a user and is inserted into first data medium drive 4. Data stored on data medium 8 is read by first data medium drive 4 and transferred to first processor 3. First processor 3 recognizes newly transmitted first data and starts a program stored in first area 6 of nonvolatile memory 5 for checking the first data transmitted from third processor 11 to a volatile memory of first processor 3 via data medium 8. First processor 3 establishes a first wireless connection 12 with test unit 14 and thus establishes contact with test unit 14. Furthermore, first processor 3 determines the second data, which is based on the first data transmitted, according to the program stored in first area 6. The second data here may contain an identity number of data medium 8 and/or a check sum, i.e., the sum or the cross-check sum of a preselected sequence of bytes of the first data, segments or some other coding of the first data. In another example embodiment, at least partial transmission of the first data as second data to test unit 14 is also possible. The second data transmitted by controller 1 via first wireless connection 12 is checked in test unit 14 on the basis of a comparison with data stored in database 16. For example, it is possible to check an identity number of data medium 8 and/or an identity number of first processor 3 here. This makes it possible to check, for example, whether the owner of first processor 3 is authorized to use data medium 8. Furthermore, it is possible to check whether the first data stored on data medium 8 can be used by first processor 3, and in particular whether data medium 8 contains an authorized copy of the first data or whether the first data is in fact suitable for use in second processor 15 or 27, or whether it is a false or outdated version of the first data, for example. If this is the case, a user license is transmitted to first processor 3 over first wireless connection 12. First processor 3 stores in second area 7 of nonvolatile memory 5 the fact that first processor 3 is allowed to use the first data. In a preferred exemplary embodiment, at least a portion of the first data is stored in third area 17 of nonvolatile memory 5. The first data can also be stored in motor vehicle 20 in a bulk storage device such as a hard drive which is connected to controller 1. The first data can then be used by first processor 3, either with access to data medium 8, third area 17 and/or the bulk storage device to control automotive system 2, e.g., a gasoline injection system, an engine control unit or a display unit. In one example embodiment, the issuance of the user license is relayed to an accounting office 13 which charges the user of motor vehicle 20 with the cost of using the first data, e.g., by charging the user's credit card account. In one example embodiment, first wireless connection 12 is established over a secure connection by having the second data to be transmitted encoded by first processor 3 and decoded again by second processor 15. Likewise, this is also true of the reverse transmission of a user license from second processor 15 to first processor 3. For coding, a private key of first processor 3 or second processor 15 is used in particular, so that it is possible to identify the processor making the transmission, and counterfeiting of a user license is prevented.

In one example embodiment, nonvolatile memory 5 is designed as a semiconductor component which is fixedly installed in controller 1 so that the check can be bypassed only by replacing nonvolatile memory 5. The device for data medium processing 10 may be in the possession of the user of the vehicle, loading data by calling it up over a data network such as the Internet and bringing it onto data medium 8 by way of this device for data medium processing 10 and thereby into motor vehicle 20. Furthermore, the device for data medium processing 10 may also be operated by a manufacturer of controller 1 or another commercial supplier of data for motor vehicle 20 or for controller 1. Improper or prohibited use of data in controller 1 can be prevented with a check by check unit 14, which is, for example, also operated by the manufacturer of motor vehicle 20 or of controller 1. If a user license is refused by check unit 14 or if no response from check unit 14 arrives at first processor 3, the first data stored in first processor 3 is deleted in motor vehicle 20. In an example embodiment, a usage inquiry is made repeatedly with check unit 14 after preselectable intervals so that a time restriction on use of the first data is possible and can be verified.

Figure 2:
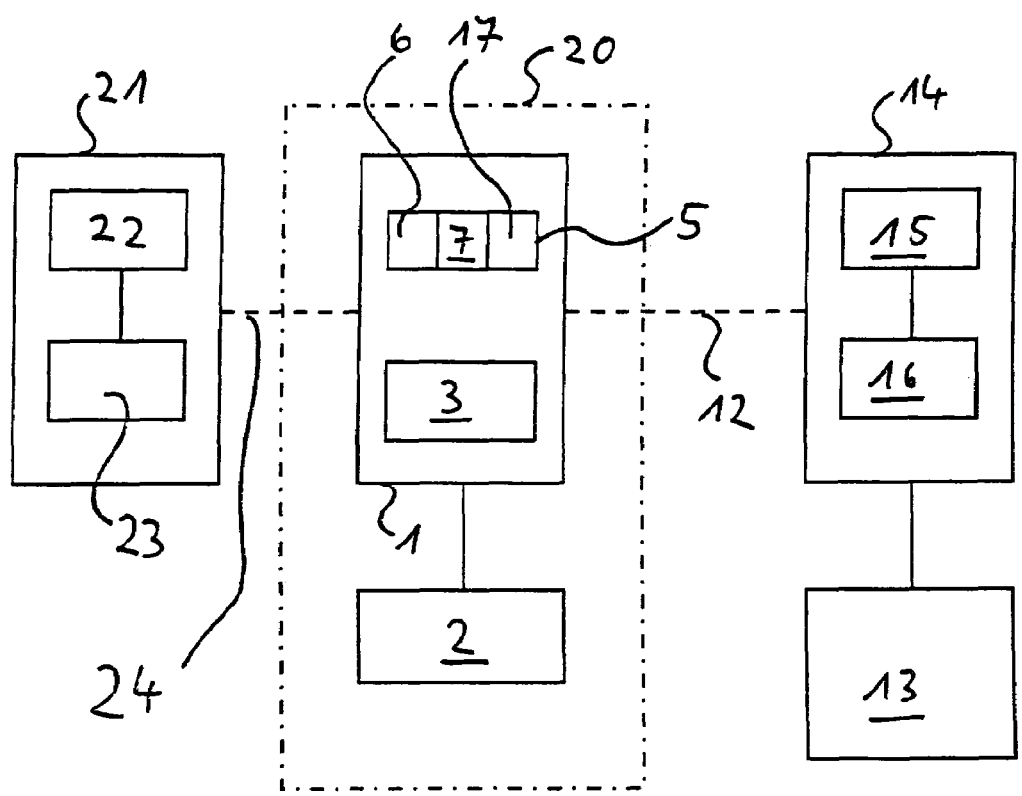
FIG. 2 shows a second exemplary embodiment of a device for carrying out a method according to an example embodiment of the present invention.

FIG. 2 illustrates a second exemplary embodiment of a device for carrying out a method according to an example embodiment of the present invention. Here and below, the same reference numbers also denote the same elements. Controller 1 can be connected via a second wireless connection 24 to a central service office 21 which has a third processor 22 and a data memory 23. First data stored in data memory 23 can be called up from first processor 3 by the central service office over second wireless connection 24. Third processor 22 thus transfers the first data stored in the data memory over second wireless connection 24 to first processor 3 of controller 1 on request by first processor 3. A data medium drive in motor vehicle 20 is not necessary in this exemplary embodiment, but it may be used in addition.

First wireless connection 12 and second wireless connection 24 are, for example, designed as mobile wireless connections (e.g., GSM, UMTS). Second wireless connection 24 is designed in particular as a wireless connection which permits a high data throughput to permit transmission of even large volumes of data, e.g., for map data for a navigation system or for program data for an engine control unit within an acceptable period of time for a user. Furthermore, it is also possible that central service office 21, controller 1 and check unit 14 are all connected to a data network such as the Internet and there is communication among the individual units over the data network. A wireless interface for first wireless connection 12 may also be used for the second wireless connection.

Figure 3:
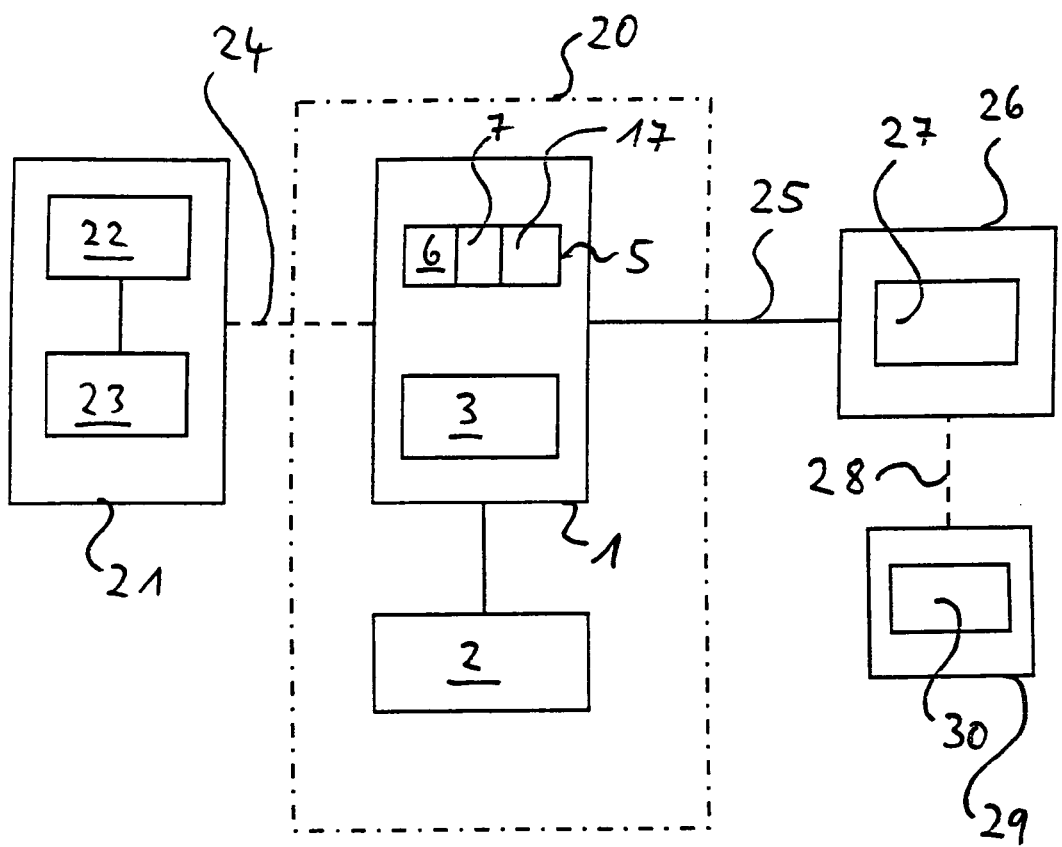
FIG. 3 shows a third exemplary embodiment of a device for carrying out a method according to an example embodiment of the present invention.

FIG. 3 illustrates another exemplary embodiment in which check unit 14 is replaced by a diagnostic device 26 which is connected to motor vehicle 20 or to controller 1 by a plug connection 25. A second processor 27 is arranged in diagnostic device 26 and is used to check the second data transmitted from first processor 3 over plug connection 25 to second processor 27. As shown in FIG. 3, the first data can be supplied to first processor 3 over second wireless connection 24. In an exemplary embodiment which is not shown in FIG. 3, a supply of the first data to the third processor by way of a data medium 8 according to the exemplary embodiment of FIG. 1 is also possible. Through the use of diagnostic device 26, it is also possible to check on the correctness of the first data stored in controller 1, e.g., in a workshop, without establishing a wireless connection. A check can be started by diagnostic device 26, for example. Inadmissible first data can be deleted from controller 1. In one example embodiment, diagnostic device 26 can be connected by a third wireless connection 28 to a database 30 in a second central service office 29 by way of which an identity of the first processor or a license to use the first data by the first processor can be checked. Second central service office 29 may be operated by the manufacturer of motor vehicle 20 or the manufacturer of controller 1.

Figure 4:
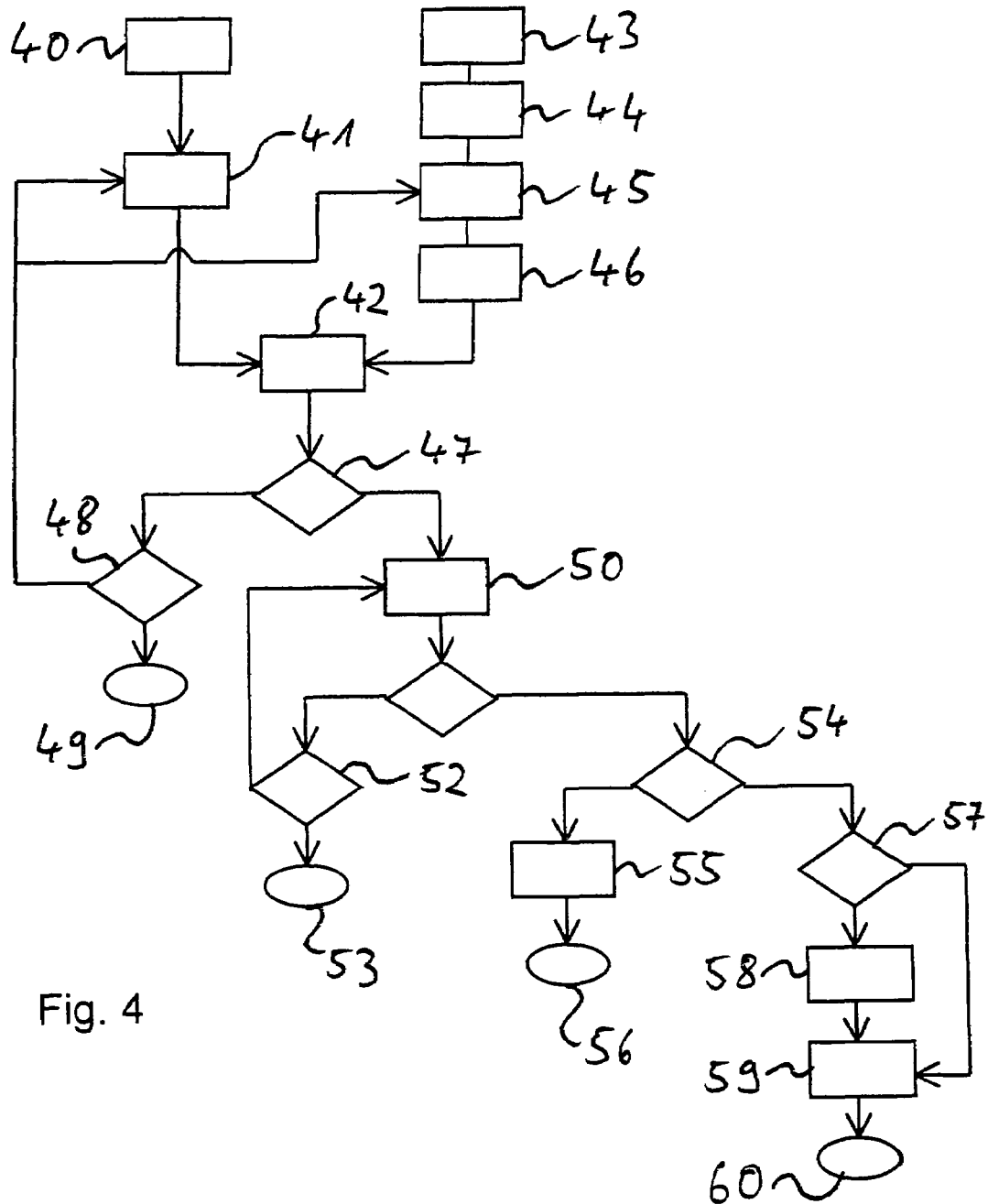
FIG. 4 shows a flow chart according to the present invention.

FIG. 4 shows a first example embodiment of the sequence of the method according to the present invention. This method can be used for transmitting first data to the first processor by way of a data medium 8 and also by way of transmitting first data from a central service office 21. In an initializing step 40, the method according to the present invention is started by inserting data medium 8 into first data medium drive 4. In a subsequent loading step 41, the first data is transmitted from data medium 8 to first processor 3. Then the checking operation is initiated with a determination step 42.

If the data is transmitted from a central service office 21 to first processor 3, the process sequence begins with an inquiry step 43 with which first data is called up by central service office 21 from first processor 3 over second wireless connection 24. In an encoding step 44, the first data is encoded by third processor 22 and/or signed electronically and transmitted in a subsequent transmission step 45 to first processor 3. In a subsequent decoding step 46, the encoded and/or electronically signed data thus transmitted is decoded by first processor 3. In a preferred exemplary embodiment, a publicly accessible key of first processor 3 is used for encoding and/or electronically signing the data in third processor 22, so that the data can be decoded and/or the electronic signature can be checked only by first processor 3, the first processor having the respective private key for decoding. Furthermore, a private key of third processor 22 is used for encoding, so that an unambiguous identification of the data source is possible. The check process is started with determination step 42. If the check process is interrupted before it has run, e.g., by a power failure, the check process are at least be started again, beginning with determination step 42, where it is ascertained that a transmission of first data to first processor 3 has been terminated, i.e., where it is ascertained that the first data is available on a data medium. With the start of the subsequent check sequence, a code for the fact that a check process is running is stored, for example, in nonvolatile memory 5, for example in second area 7 where the check result is stored. If the power supply to the controller is interrupted, then with a renewed start of controller 1, it is ascertained that a checking process has not been terminated and the checking process is restarted, beginning with determination step 42.

Determination step 42 is followed by a first check step 47 in which a check is performed to determine whether the data transmitted to first processor 3 has been transmitted correctly. A correct transmission is the case, for example, when there is error-free decoding in the case when the data has been transmitted in encoded form. Furthermore, parity data may also be added to the first data and used to detect a transmission error. If it is found that the data has not been transmitted correctly, then the process branches off to a second check step 48 in which a check is performed to determine whether the transmission of data to first processor 3 has already been repeatedly unsuccessful. A tolerance threshold can be preselected here. For example, if data is read from a data medium 8, multiple attempts to read the data from the data medium, which might be slightly soiled or damaged, can be made with no problem. If data is transmitted over a wireless connection, multiple repeats cause high transmission costs. Therefore, the number of attempts should be limited, e.g., to three transmission attempts. If it is found in the second check step that an error-free transmission was repeatedly not possible, then the process branches off to a final step 49 in which the user receives a warning that transmission or use of the first data in controller 1 is not possible. However, if it is found in second check step 48 that at least one more attempt to transmit the data should be made, then the process branches back off to loading step 41 or to transmission step 45.

If it is found in first check step 47 that the first data has been transmitted without errors to the first processor, then the process branches off to a transmission and transfer step 50, where a check code, e.g., a check sum, a sequence of certain characters of the first data or other preselectable parts of the first data is determined from the first data. Preferably an identity, especially an identity number of first processor 3, data medium 8 and/or third processor 22 is added to the second data. In determination and transmission step 50, this data may be, for example, encoded and/or signed electronically and transmitted to check unit 14 or to diagnostic device 26. Encoding of the second data makes it difficult to simulate a check unit 14 or a diagnostic device 26 and thus bypass a checking process of the first data through unallowed counterfeiting of a check unit 14 or a diagnostic device 26. In a subsequent third check step 51, an error-free transmission of the second data from first processor 3 to second processor 15 according to the exemplary embodiment of FIGS. 1 and 2 or to second processor 27 according to the exemplary embodiment of FIG. 3 is checked. If no error-free transmission is found, then the process branches off to a fourth check step 52 where a check is performed to determine whether an error-free transmission of the second data has failed repeatedly. If it is found that there have been repeated failed attempts at correct transmission of the second data, the number of the maximum transmission subject to error also being preselectable, then the process branches off to a final step 53. In final step 53, second processor 15 or 27 transmits to first processor 3 the result that the second data could not be transmitted without errors. This is output by the first processor, e.g., on a display or over a loudspeaker (not shown in the drawing). If contact with the second processor is not possible, this is also detected and output by first processor 3. The check process is thus interrupted and optionally resumed again at a later time, starting from determination step 42. If it is found in fourth check step 52 that a renewed attempt at transmission of the second data is possible, then the process branches off back to determination and transmission step 50, and the second data is again transmitted from first processor 3 to second processor 15 or 27.

If it is found in third check step 51 that the second data has been transmitted correctly, then the process branches off to fifth check step 54, where the second data is checked by second processor 15 or 27 to determine whether the first data on which the second data is based can be used in first processor 3. In this case, a check is performed to determine, for example, whether the first data is admissible data for use in first processor 3. Furthermore, a check can be performed to determine whether the first data stored on data medium 8 is a licensed copy of the first data or whether an identity number of data medium 8 has already been registered for use on another first processor 3, and thus this is unauthorized use of data medium 8 as an original or as a copy. Therefore, in a fifth check step 54, database 16 or database 30 is polled. Furthermore, a personal identification number (PIN) or a transaction number (TAN) to be entered additionally by a user into the first processor may also be checked here.

If it is found in fifth check step 54 that the first data in first processor 3 must not be used, then the process branches off to a prohibition step 55, where a prohibition against use of the first data is transmitted to the first processor by second processor 15 or 27. Then, the process branches off to a final step 56, where the first data in first processor 3 and thus in first controller 1 and motor vehicle 20 is deleted. If it is found in fifth check step 54 that use of the first data by first processor 3 is allowed, then the process branches off to a sixth check step 57, where a check is performed to determine whether payment is required for use of the first data by first processor 3. If payment is required, then the process branches off again to an accounting step 58, where a predetermined amount is billed to the user of motor vehicle 20 by accounting office 13, e.g., by a charge to a credit card. If it is found in sixth check step 57 that no accounting is necessary, then the process branches off to a license step 59. License step 59 is also reached from accounting step 58. In license step 59, a license to use the first data by first processor 3 is transmitted to first processor 3. In a subsequent use step 60, the check process is terminated and a positive check result for a license to use the first data in first processor 3 and a conclusion of the check process are stored in nonvolatile memory 5. The first data transmitted to first processor 3, e.g., program data or information data, can then be used by first processor 3 due to the fact that the program described by the first data is executed or the information contained in the first data is analyzed and/or output by first processor 3. This use is either unlimited in time or is possible for a predetermined period of time, which is then also preferably stored in nonvolatile memory 5. After the end of this predetermined period of time, a check according to the example embodiment of the present invention is again performed, starting from determination step 42, so that either the first data is erased from first processor 3 and thus also from controller 1 or a new calculation is performed with accounting step 58 of the check process, thus resulting in a further release.

What is claimed is:

1. A method for transmitting data between a motor vehicle controller having a first processor and a test unit having a second processor, the method comprising:
   transmitting first data to the motor vehicle controller to be used at the first processor;
   determining second data as a function of the first data;
   transmitting the second data to the second processor;
   checking the second data in the second processor to determine if the first data may be used in the first processor;
   transmitting a check result to the first processor, the check result being a positive check result or a negative check result;
   responsive to receiving a positive check result, using the first data at the first processor;
   making repeated usage inquiries to the second processor each after a preselected time interval; and
   checking in the second processor an identity of the third processor;
   checking an error-free transmission in at least one of the first processor and the second processor;
   accessing a database in the second processor to check the second data;
   authorizing or prohibiting a use of the second data in checking the first data;
   initiating by the second processor a payment process as a function of the second data;
   starting a check of the first data in the first processor; and
   restarting the check in the first processor if the check has not been run through completely;
   storing a program for checking at least one of the first data and the check result in a nonvolatile form in the second processor; and
   deleting the first data in the first processor if a user license for the first data is not transmitted by a third processor;
   wherein the transmitting of the first data includes transmitting the first data to the first processor from one of a data medium drive and a third processor,
   wherein at least one of an utilization permission of the first data and the second data is at least one of: i) transmitting in encoded form, and ii) transmitted with an electronic signature, wherein at least one of the first data and the second data is at least one of: i) encoded with a private key of a respective processor, and ii) provided with an electronic signature, wherein the checking further includes determining an admissibility of the first data, and wherein the checking is executed at specifiable time intervals.

2. The method according to claim 1, further comprising:
connecting the first processor to the second processor using a wireless connection.

3. The method according to claim 1, further comprising:
connecting the second processor to a third processor using a wireless connection.

4. The method according to claim 1, further comprising:
allowing by the second processor a use of the first data in the first processor.

5. The method according to claim 1, further comprising:
delivering a warning if the first data is not released.

6. The method according to claim 1, further comprising:
determining a first check code from the first data; and
forming the second data at least in part from the first check code.

7. The method according to claim 6, further comprising:
determining a second check code from the first data; and
forming the second data at least in part from the second check code.

8. The method according to claim 1, wherein the checking further includes determining an admissibility of the first data.

9. The method according to claim 1, wherein the checking is executed at specifiable time intervals.

10. The method according to claim 1, further comprising:
in response to a negative check result, deleting the first data in the first processor.

11. The method of claim 1, wherein payment for using the first data is made only after the actual use of the first data.

12. The method of claim 1, wherein the second processor verifies the use of first data based on a time factor.

13. The method of claim 1, wherein payment for using the first data is made only after the actual use of the first data, and wherein the second processor verifies the use of first data based on a time factor.

14. The method according to claim 1, wherein payment for using the first data is made only after the actual use of the first data, and wherein the second processor verifies the use of first data based on a time factor.

15. The method according to claim 1, further comprising:
connecting the first processor to the second processor using a wireless connection, and connecting the second processor to a third processor using a wireless connection;
delivering a warning if the first data is not released; and
determining a first check code from the first data, and forming the second data at least in part from the first check code.

16. The method according to claim 15, further comprising:
determining a second check code from the first data, and forming the second data at least in part from the second check code; and
in response to a negative check result, deleting the first data in the first processor.

17. A method for transmitting data between a motor vehicle controller having a first processor and a test unit having a second processor, the method comprising:
transmitting first data to the motor vehicle controller to be used at the first processor;
determining second data as a function of the first data;
transmitting the second data to the second processor;
checking the second data in the second processor to determine if the first data may be used in the first processor;
transmitting a check result to the first processor, the check result being a positive check result or a negative check result;
storing by the second processor a use of the first data by the first processor;
making repeated usage inquiries to the second processor each after a preselected time interval; and
checking in the second processor an identity of the third processor;
checking an error-free transmission in at least one of the first processor and the second processor;
accessing a database in the second processor to check the second data;
authorizing or prohibiting a use of the second data in checking the first data;
initiating by the second processor a payment process as a function of the second data;
starting a check of the first data in the first processor; and
restarting the check in the first processor if the check has not been run through completely;
storing a program for checking at least one of the first data and the check result in a nonvolatile form in the second processor; and
deleting the first data in the first processor if a user license for the first data is not transmitted by a third processor;
wherein the transmitting of the first data includes transmitting the first data to the first processor from one of a data medium drive and a third processor,
wherein at least one of an utilization permission of the first data and the second data is at least one of: i) transmitting in encoded form, and ii) transmitted with an electronic signature,
wherein at least one of the first data and the second data is at least one of: i) encoded with a private key of a respective processor, and ii) provided with an electronic signature,
wherein the checking further includes determining an admissibility of the first data, and
wherein the checking is executed at specifiable time intervals.

18. A motor vehicle device for receiving data, comprising:
a controller including a first processor;
a receiver including a second processor, the receiver being coupled to the first processor configured to receive first data; and
a transmitter coupled to the first processor configured to transmit second data to the second processor, the second data being based on the first data, the second data being checked in the second processor to determine if the first data may be used in the first processor, the first processor receiving via the receiver a check result from the second processor and responsive to receiving a positive check result, the check result being a positive check result or a negative check result, using the first data at the first processor;
wherein repeated usage inquires are sent to the second processor each after a preselected time interval,
wherein there is a checking in the second processor of an identity of the third processor;
wherein there is a checking of an error-free transmission in at least one of the first processor and the second processor,
wherein there is an accessing of a database in the second processor to check the second data, wherein there is an authorizing or prohibiting of a use of the second data in checking the first data, wherein there is an initiating by the second processor a payment process as a function of the second data, wherein there is a starting of a check of the first data in the first processor, wherein there is a restarting the check in the first processor if the check has not been run through completely, wherein there is a storing of a program for checking at least one of the first data and the check result in a nonvolatile form in the second processor, wherein there is a deleting of the first data in the first processor if a user license for the first data is not transmitted by a third processor;

wherein the transmitting of the first data includes transmitting the first data to the first processor from one of a data medium drive and a third processor, wherein at least one of an utilization permission of the first data and the second data is at least one of: i) transmitting in encoded form, and ii) transmitted with an electronic signature, wherein at least one of the first data and the second data is at least one of: i) encoded with a private key of a respective processor, and ii) provided with an electronic signature, wherein the checking further includes determining an admissibility of the first data, and wherein the checking is executed at specifiable time intervals.

19. A controller in a motor vehicle, comprising:

a first processor residing in the controller, the first processor configured to receive first data and to transmit second data to a second processor, the second data being based on the first data, the second data being checked in the second processor to determine if the first data may be used in the first processor, and the first processor receiving a check result from the second processor, the check result is a positive check result or negative check result, and responsive to receiving a positive check result, using the first data at the first processor;

wherein repeated usage inquires are sent to the second processor each after a preselected time interval, wherein there is a checking in the second processor of an identity of the third processor;

wherein there is a checking of an error-free transmission in at least one of the first processor and the second processor, wherein there is an accessing of a database in the second processor to check the second data, wherein there is an authorizing or prohibiting of a use of the second data in checking the first data, wherein there is an initiating by the second processor a payment process as a function of the second data, wherein there is a starting of a check of the first data in the first processor, wherein there is a restarting the check in the first processor if the check has not been run through completely, wherein there is a storing of a program for checking at least one of the first data and the check result in a nonvolatile form in the second processor, wherein there is a deleting of the first data in the first processor if a user license for the first data is not transmitted by a third processor;

wherein the transmitting of the first data includes transmitting the first data to the first processor from one of a data medium drive and a third processor, wherein at least one of an utilization permission of the first data and the second data is at least one of: i) transmitting in encoded form, and ii) transmitted with an electronic signature, wherein at least one of the first data and the second data is at least one of: i) encoded with a private key of a respective processor, and ii) provided with an electronic signature, wherein the checking further includes determining an admissibility of the first data, and wherein the checking is executed at specifiable time intervals.

20. A check processor of a motor vehicle, comprising:

a second processor configured to receive second data from a first processor in a controller of the motor vehicle, the first processor receiving first data, forming the second data from the first data, and transmitting the second data to the second processor, the second processor checking the second data to determine if the first data may be used in the first processor and transmitting a check result to the first processor, the check result being a positive check result or a negative check result, and responsive to receiving a positive check result, using the first data at the first processor;

wherein repeated usage inquires are sent to the second processor each after a preselected time interval, wherein there is a checking in the second processor of an identity of the third processor;

wherein there is a checking of an error-free transmission in at least one of the first processor and the second processor, wherein there is an accessing of a database in the second processor to check the second data, wherein there is an authorizing or prohibiting of a use of the second data in checking the first data, wherein there is an initiating by the second processor a payment process as a function of the second data, wherein there is a starting of a check of the first data in the first processor, wherein there is a restarting the check in the first processor if the check has not been run through completely, wherein there is a storing of a program for checking at least one of the first data and the check result in a nonvolatile form in the second processor, wherein there is a deleting of the first data in the first processor if a user license for the first data is not transmitted by a third processor;

wherein the transmitting of the first data includes transmitting the first data to the first processor from one of a data medium drive and a third processor, wherein at least one of an utilization permission of the first data and the second data is at least one of: i) transmitting in encoded form, and ii) transmitted with an electronic signature, wherein at least one of the first data and the second data is at least one of: i) encoded with a private key of a respective processor, and ii) provided with an electronic signature, wherein the checking further includes determining an admissibility of the first data, and wherein the checking is executed at specifiable time intervals.

21. A method for data transmission, the method comprising:

transmitting first data to a first processing unit, the first data being program data for controlling a processing unit or a device;

transmitting second data, relating to the first data, to a second processing unit, the second data in the second processing unit being checked to determine whether the first data are allowed to be used in the first processing unit;
transmitting a result of the check to the first processing unit;
transmitting a ban, on a use of the first data, from the second processing unit to the first processing unit if the first data are not allowed to be used in the first processing unit;
transmitting a permission, if the first data are allowed to be used in the first processing unit, for using the first data from the second processing unit to the first processing unit; and
making repeated usage inquiries to the second processor each after a preselected time interval,
wherein there is a checking in the second processor of an identity of the third processor;
wherein there is a checking of an error-free transmission in at least one of the first processor and the second processor,
wherein there is an accessing of a database in the second processor to check the second data,
wherein there is an authorizing or prohibiting of a use of the second data in checking the first data,
wherein there is an initiating by the second processor a payment process as a function of the second data,
wherein there is a starting of a check of the first data in the first processor,
wherein there is a restarting the check in the first processor if the check has not been run through completely,
wherein there is a storing of a program for checking at least one of the first data and the check result in a nonvolatile form in the second processor,
wherein there is a deleting of the first data in the first processor if a user license for the first data is not transmitted by a third processor;
wherein the transmitting of the first data includes transmitting the first data to the first processor from one of a data medium drive and a third processor,
wherein at least one of an utilization permission of the first data and the second data is at least one of: i) transmitting in encoded form, and ii) transmitted with an electronic signature,
wherein at least one of the first data and the second data is at least one of: i) encoded with a private key of a respective processor, and ii) provided with an electronic signature,
wherein the checking further includes determining an admissibility of the first data, and
wherein the checking is executed at specifiable time intervals.

* * * * *